United States Patent
Yun et al.

(10) Patent No.: US 8,335,048 B2
(45) Date of Patent: Dec. 18, 2012

(54) METHOD OF MANAGING DEFECT AND APPARATUSES USING THE SAME

(75) Inventors: Sung Joong Yun, Suwon-si (KR); Sang-Tae Kim, Suwon-si (KR)

(73) Assignee: Seagate Technology, Cupertino, CA (US)

( * ) Notice: Subject to any disclaimer, the term of this patent is extended or adjusted under 35 U.S.C. 154(b) by 78 days.

(21) Appl. No.: 12/890,843

(22) Filed: Sep. 27, 2010

(65) Prior Publication Data

US 2011/0102932 A1     May 5, 2011

(51) Int. Cl.
G11B 5/09     (2006.01)
G11B 27/36    (2006.01)

(52) U.S. Cl. .......................................... 360/53; 360/31

(58) Field of Classification Search .................. None
See application file for complete search history.

(56) References Cited

U.S. PATENT DOCUMENTS 6,606,211 B1 *   8/2003   Lim et al. .................... 360/53
2009/0034109 A1   2/2009   Paul et al.

FOREIGN PATENT DOCUMENTS

| JP | 2009-32378 | 2/2009 |
| KR | 1999-56099 | 7/1999 |
| KR | 2008-6361 | 1/2008 |

* cited by examiner

*Primary Examiner* — Regina N Holder

(57) ABSTRACT

A method of managing a defect of a hard disk drive includes calculating a number of ECC symbols of every sector which becomes an object of a defect scan and setting a defect reference value based on results of the calculation. The hard disk drive sets a sector as a defect sector having the number of ECC symbols greater than a set defect reference value.

8 Claims, 5 Drawing Sheets

FIG. 3

| CHS | THE NUMBER OF ECC SYMBOLS |
|---|---|
| 1 | 0 |
| 2 | 1 |
| 3 | 5 |
| 4 | 12 |
| 5 | 9 |
| 6 | 17 |
| 7 | 3 |
| 8 | 8 |
| ⋮ | |
| n | 11 |

METHOD OF MANAGING DEFECT AND APPARATUSES USING THE SAME

CROSS-REFERENCE TO RELATED APPLICATIONS

This application claims priority under 35 U.S.C. §119 from Korean Patent Application No. 10-2009-0105420 filed on Nov. 3, 2009, the disclosure of which is hereby incorporated by reference in its entirety.

BACKGROUND

1. Field of the Invention

Embodiments of the present inventive concept relate to a method of managing a defect, and more particularly, to a method changing a defect scan condition variably and a hard disk drive using the method.

2. Description of the Related Art

After a hard disk drive (HDD) is assembled, a defect scan is performed to detect a defect in a storage medium of the HDD. Since a conventional HDD detects defected sectors according to only one defect scan condition, a replacement region replacing the defected sectors may overflow, or only a part of it may be used so the replacement region is used very inefficiently.

SUMMARY

The present general inventive concept provides a method of changing a defect scan condition variably to use or manage a replacement region that replaces defected sectors efficiently and a hard disk drive using the method.

Additional features and utilities of the present general inventive concept will be set forth in part in the description which follows and, in part, will be obvious from the description, or may be learned by practice of the present general inventive concept.

An exemplary embodiment of the present general inventive concept relates to a method of managing a defect of a hard disk drive, including calculating the number of ECC symbols of every sector, which becomes an object of a defect scan, and setting a defect reference value based on results of the calculation.

The setting the defect reference value includes storing a log of the number of calculated ECC symbols calculated corresponding to a sector in a memory or a magnetic storage medium and setting the defect reference value determining a corresponding sector as a defect sector based on the log stored in the memory or the magnetic storage medium and a size of a replacement region. The method of managing a defect of the hard disk drive further includes setting a sector having the number of calculated ECC symbols greater than a set defect reference value as a defect sector.

An exemplary embodiment of the present general inventive concept is directed to a hard disk drive, including a magnetic storage medium, a head, and a hard disk controller that calculates the number of ECC symbols of every sector, which becomes an object of a defect scan, based on a signal output from the head and setting a defect reference value based on results of the calculation.

According to exemplary embodiments, the hard disk controller sets the defect reference value which may determine a corresponding sector as a defect sector based on the number of calculated ECC symbols of every sector and a size of a replacement region. According to another example embodiment, the hard disk controller stores the number of calculated ECC symbols corresponding to each sector in a memory or a magnetic storage medium and sets the defect reference value that indicates a corresponding sector as a defect sector referring to the number of all ECC symbols stored in the memory or the magnetic storage medium.

The hard disk controller sets a sector having the number of calculated ECC symbols greater than a set defect reference value as a defect sector.

The hard disk controller stores a log of the number of calculated ECC symbols corresponding to each sector in a memory or a magnetic storage medium and sets the defect reference value corresponding to each sector as a defect sector based on the log stored in the memory or the magnetic storage medium and a size of a replacement region.

An example embodiment of the present general inventive concept is directed to a computer system, including a hard disk drive and a processor to control an operation of the hard disk drive. The hard disk drive includes a magnetic storage medium, a head and a hard disk controller that calculates the number of ECC symbols of every sector, which becomes an object of a defect scan, based on a signal output from the head, and sets a defect reference value based on a result of the calculation.

The hard disk controller sets the defect reference value indicating a corresponding sector as a defect sector based on the number of calculated ECC symbols and a size of a replacement region of every sector. The hard disk controller sets a sector having the number of calculated ECC symbols greater than a set defect reference value as a defect sector.

In another feature, a defect sector detection module to detect a defect sector of a storage medium having a plurality of sectors to store data and a replacement region, comprises a read/write module in communication with the storage medium that reads data from the storage medium, and a hard disk controller that receives the read data from the read/write module and that determines a size of the replacement region and that calculates a number of ECC symbols of each sector among the plurality of sectors and that varies a defect scan condition based on results of the calculation and the size of the replacement region.

BRIEF DESCRIPTION OF THE DRAWINGS

These and/or other features and advantages of the present general inventive concept will become apparent and more readily appreciated from the following description of the exemplary embodiments, taken in conjunction with the accompanying drawings of which

FIG. 3 shows an ECC symbol count value measured by sector according to an example embodiment of the present general inventive concept;

DETAILED DESCRIPTION OF THE EMBODIMENTS

Figure 1:
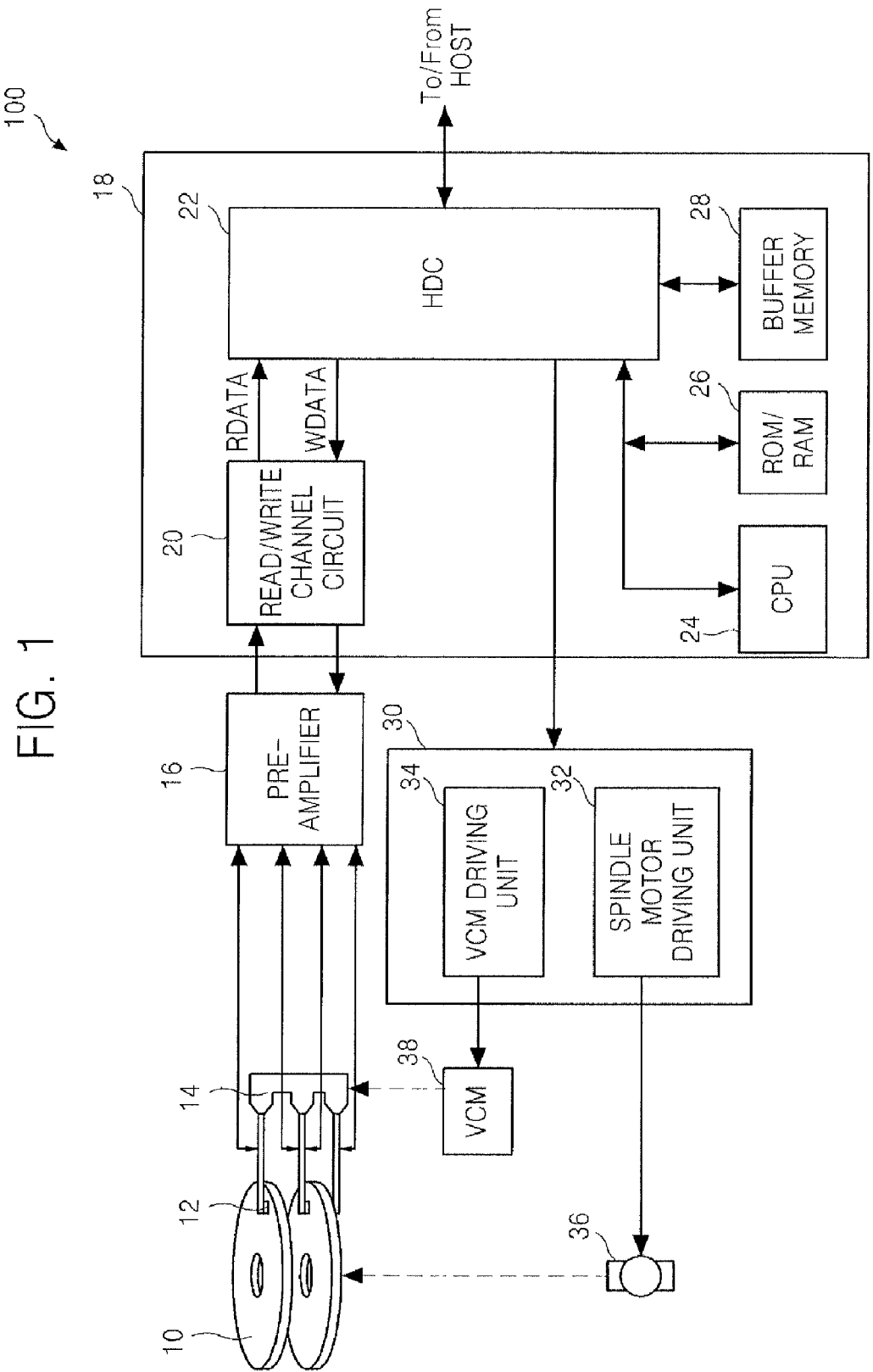
FIG. 1 is a schematic block diagram of a hard disk drive changing a defect scan condition according to an example embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a schematic block diagram of a hard disk drive to set a defect scan condition according to an example embodiment of the present general inventive concept. Referring to FIG. 1, a hard disk drive (HDD) 100 includes a plurality of magnetic storage mediums 10, a plurality of heads 12, a head assembly 14, a pre-amplifier 16, a defect sector detection module 18, a motor control block or a servo control block 30, a spindle motor 36 and a voice coil motor VCM 38.

The plurality of magnetic storage mediums 10 may store data and may be rotated by the spindle motor 36. Each of the plurality of magnetic storage mediums 10 includes a replacement region to replace or be assigned defect sectors. According to embodiments, a log of defect sectors may be recorded in at least one of the plurality of magnetic storage mediums 10.

Each of the plurality of heads 12 may be located on a corresponding one of the plurality of magnetic storage mediums 10 and performs a read operation and/or a write operation. Each of the heads 12 may be installed in each support arm, and may extend in a direction of the plurality of magnetic storage mediums 10 from the head assembly 14 that may be coupled to the VCM 38.

When reading data stored in a magnetic storage medium, e.g., a magnetic disk, the pre-amplifier 16 amplifies a read signal output from one of the plurality of heads 12, and outputs an amplified read signal to a read/write channel circuit 20. When writing data in the magnetic storage medium, the pre-amplifier 16 transmits a write signal, e.g., a write current, output from the read/write channel circuit 20 to one of the plurality of heads 12. Accordingly, the one head may write the write signal in one of the plurality of magnetic storage mediums 10.

The read/write channel circuit 20 converts a read signal amplified by the pre-amplifier 16 to read data and outputs the read data RDATA to a hard disk controller (HDC) 22. The HDC 22 may perform an ECC operation of the read data RDATA. The read/write channel circuit 20 also converts write data WDATA output from the HDC 22 to a write signal and outputs the write signal to the pre-amplifier 16.

The HDC 22, when writing data in a magnetic storage medium, may output write data output from a host under a control of a CPU 24 to the read/write channel circuit 20. Accordingly, the write data output from the host may be written in one of the plurality of magnetic storage mediums 10 through the read/write channel circuit 20, the pre-amplifier 16 and a corresponding head. The HDC 22, when reading data from a magnetic storage medium, may also receive read data decoded by the read/write channel circuit 20 under a control of the CPU 24, perform an ECC of received data, and transmit them to the host through an interface 46 (see FIG. 2).

The HDC 22 may calculate a number of error correction code (ECC) of every sector included with the storage medium 10, which becomes an object of a defect scan, based on the read data RDATA output from the read/write channel circuit 20, and may set a defect reference value adaptively to detect a defect sector based on a result of the calculation. For example, the HDC 22 may store a log of the number of calculated ECC symbols of a sector in a memory or a magnetic storage medium, and set a defect reference value based on the log stored in the memory or the magnetic storage medium and a size of a replacement region of the storage medium 10. Accordingly, the HDC 22 may detect a defect sector of a scanned storage medium 10 based on a number of ECC symbols being greater than a set defect reference value, which varies according to a size of the a replacement region of the scanned storage medium 10. Therefore, the HDD 100 may efficiently utilize the replacement region of the scanned storage medium 10.

The CPU 24 may read a control code or a boot code stored in a ROM 26, store the code in a RAM, and control an operation of the HDD 100 or the HDC 22 based on the control code or the boot code stored in the RAM. Therefore, the CPU 24 may control a read operation and/or a write operation of the HDD 100. For convenience of explanation in FIG. 1, a ROM and a RAM are illustrated as a single a memory device; however, the ROM and the RAM may be different memory devices, respectively, and may be separated physically from one another.

The CPU 24 may receive a read command and/or a write command output from the host via interfaces 46 and 48, each being connected to a bus 41, and may control an operation of a servo controller 42 (see FIG. 2) to control a spindle motor driving unit 32 and a VCM driving unit 34 to control track seek and/or track following according to a received command.

The spindle motor driving unit 32 controls an operation of a spindle motor 36 to control rotation of the plurality of magnetic storage mediums 10 in response to a control signal output from the servo controller 42 of the HDC 22. The VCM driving unit 34 generates and outputs a driving current to drive a VCM 38 to a voice coil of the VCM 38 in response to a control signal to control each location of the plurality of heads 12 outputted from the servo controller 42.

Accordingly, the VCM 38 moves the plurality of heads 12 over a track embodied in one of the plurality of magnetic storage mediums 10, where data to read is recorded, according to a direction and level of the driving current output from the VCM driving unit 34.

A head 12 moved by the VCM 38 outputs location information recorded on a disk 10 to the pre-amplifier 16 based on a control signal output from the read/write channel circuit 20.

When the head 12 is moved to read a target track of a magnetic storage medium, a disk formatter 50 (see FIG. 2) of the HDC 22 outputs a servo gate signal to the read/write channel circuit 20. The read/write channel 20 reads a servo pattern recorded in the magnetic storage medium 10 in response to the servo gate signal. The servo pattern may be utilized by the HDC 22 to further control a position of the head 12 with respect to the recording medium 10. A buffer memory 28 may temporarily store data exchanged between the HDD 100 and the host. According to embodiments, the buffer memory 28 may be embodied outside the defect sector detection module 18.

According to at least one exemplary embodiment, the defect sector detection module 18 including the read/write channel circuit 20, the HDC 22, the CPU 24, the ROM/RAM 26 and a memory 28 may be embodied as a chip, e.g., a system on chip (SoC). In addition, a motor control block 30 including the spindle motor driving unit 32 and the VCM driving unit 34 may also be embodied as a chip, e.g., SoC.

Figure 2:
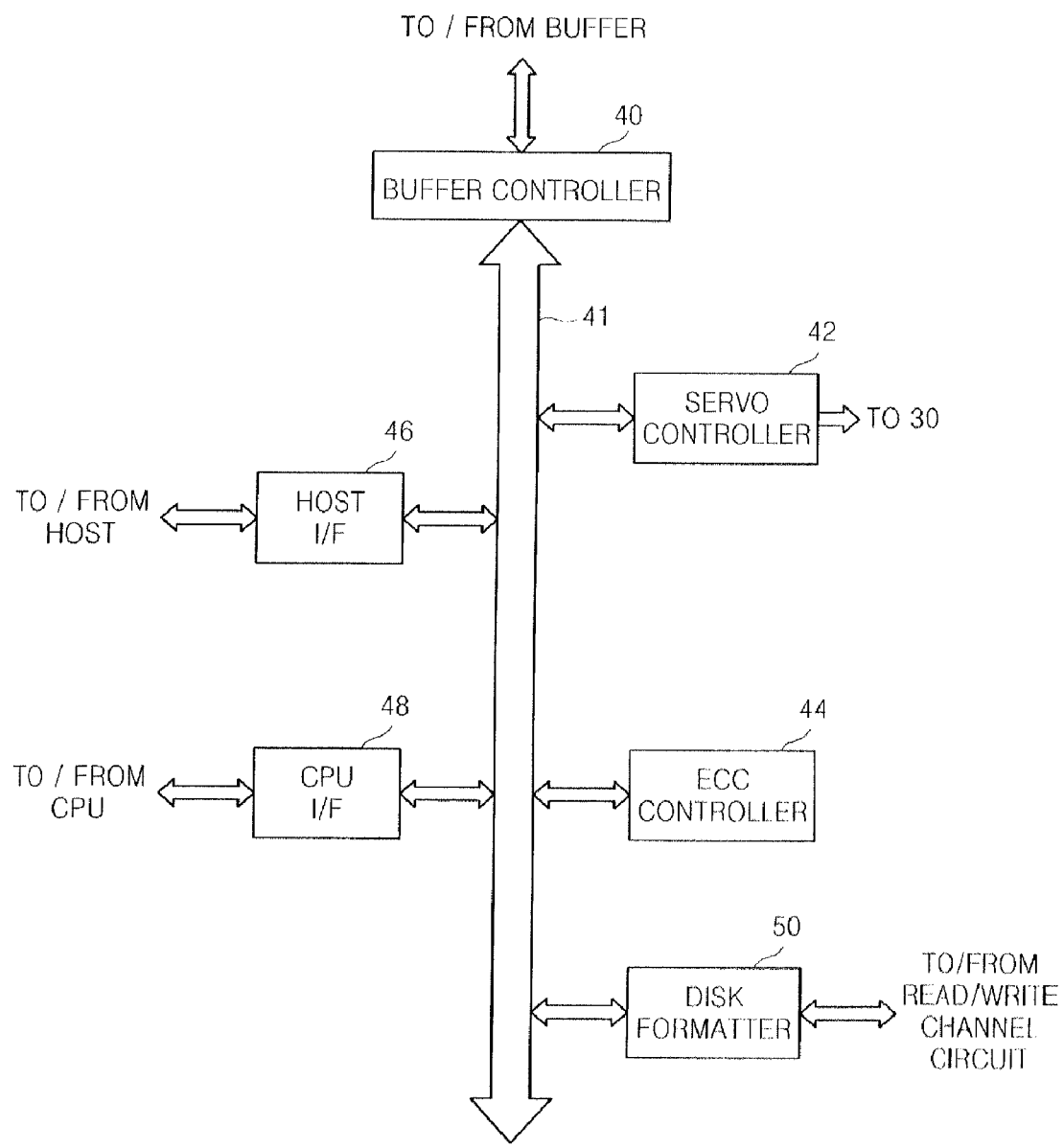
FIG. 2 is a schematic block diagram of a hard disk controller illustrated in FIG. 1.

FIG. 2 shows a schematic block diagram of a hard disk controller illustrated in FIG. 1. Referring to FIGS. 1 and 2, the HDC 22 exchanges data with the buffer memory 28 through a buffer controller or a buffer interface 40.

The servo controller 42 controls an operation of the motor control block 30, e.g., an operation of the spindle motor driving unit 32 and an operation of the VCM driving unit 34, under a control of the CPU 24. The ECC controller 44 may perform an ECC on read data RDATA output from the read/write channel circuit 20, and may transmit error-corrected data to the host through the host interface 46. According to exemplary embodiments, the ECC controller 44 may calculate the number of ECC symbols of every sector of a storage medium 10, which becomes an object of a defect scan, under a control of the CPU 24. The number of calculated ECC symbols of a sector may be stored in a memory or a magnetic storage medium. The memory and/or magnetic storage may be internally included with the HDD 100, or may be an external memory device that communicates with the HDD 100. The external memory device may communicate with the HDD by being connected to a communication interface and/or may communicate with the HDD via wireless communication.

The HDC 22 may communicate with the host through the host interface 46. The HDC 22 communicates with the CPU 24 and/or the ROM/RAM 26 through the CPU interface 48.

During a write operation, the disk formatter 50 may transmit write data output from the host and input through the host interface 46, and/or write data stored in the buffer memory 28, to the read/write channel 20. According to exemplary embodiments, the write data output from the host may be transmitted to the read/write channel 20 through the disk formatter 50 under a control of the CPU 48 after being stored in the buffer memory 28 temporarily.

During a read operation, the disk formatter 50 may transmit read data output from the read/write channel 20 to at least one of the buffer memory 28, the host interface 46, and the CPU interface 48. According to exemplary embodiments, the read data output from the read/write channel 20 and the disk formatter 50 may be transmitted to the host interface 46 under a control of the CPU 48 after being stored in the buffer memory 28 temporarily.

Figure 4:
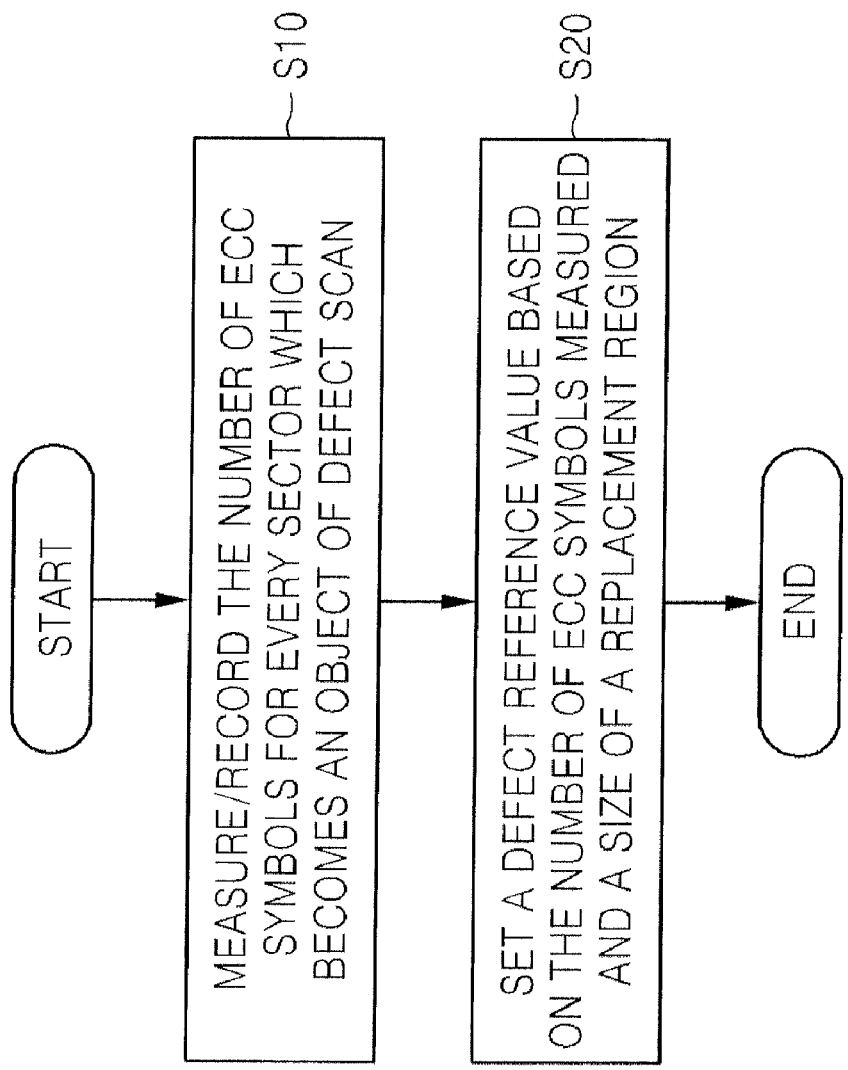
FIG. 4 is a flowchart illustrating a method of changing a defect scan condition variably according to an example embodiment of the present general inventive concept.

FIG. 3 shows a number of measured, i.e., calculated, ECC symbols of a sector according to at least one exemplary embodiment of the present general inventive concept. Additionally, FIG. 4 is a flowchart illustrating a method variably changing a defect scan condition according to at least one exemplary embodiment of the present general inventive concept. Here, for example, the defect scan condition may include, but is not limited to, a defect reference value.

Referring to FIGS. 1 to 4, the HDC 22 calculates the number of error correction code symbols of every sector included in a storage medium 10, which becomes an object of a defect scan, from read data RDATA input through the read/write channel circuit 20. Based on the calculation, the HDC 22 sets a defect reference value.

For example, the ECC controller 44, under a control of the CPU 24, measures (i.e., calculates) the number of ECC symbols of each cylinder head sector (CHS) of all magnetic storage mediums, and stores (i.e., records) a log of the number of ECC symbols measured or calculated corresponding to a CHS in a memory or a magnetic storage medium 10 (S10). The memory may be embodied inside the HDC 22 and/or outside the HDC 22. According to exemplary embodiments, the number of calculated ECC symbols of a CHS may be recorded in the ROM 26 and/or the magnetic storage medium 10.

As illustrated in FIG. 3, the number of ECC symbols or the number of ECC bits measured of each sector 1, 2, 3, 4, 5, 6, 7, 8, . . . n, is 0, 1, 5, 12, 9, 17, 3, 8, . . . 11.

As an example, in a HDD 100 that replaces/assigns 10,000 defect sectors with/to a replacement region of a magnetic storage medium 10, when the number of sectors is under 10,000 and the calculated number of ECC symbols exceeds 12, but the number of sectors is about 10,000, and the number of calculated ECC symbols exceeds 11, the HDC 22 and/or the CPU 24 may set a defect reference value to 11 and set all sectors having the calculated number of ECC symbols greater than the set defect reference value, i.e., 11, as defect sectors.

As another example, in a HDD that replaces/assigns 10,000 defect sectors with/to a replacement region of a magnetic storage medium 10, when the number of sectors is around 10,000 and the number of calculated ECC symbols exceeds 14, the HDC 22 or the CPU 24 may set a defect reference value to 14, and set all sectors having the calculated number of ECC symbols greater than the set defect reference value, i.e., 14, as defect sectors.

As described above, the HDC 22 and/or the CPU 24 according to exemplary embodiments of the present general inventive concept may adaptively set a defect reference value based on the number of calculated ECC symbols measured of a CHS and a size of a replacement region of a recording medium to replace defect sectors (S20).

According to at least one exemplary embodiment, the HDD 100 may perform a defect scan only once corresponding to each sector which becomes an object of defect scan and adaptively set a defect reference value to detect a number of defect sectors based on a number of calculated ECC symbols of each sector and a size of a replacement region. Accordingly, the HDD 100 may use almost 100% of the replacement region.

Figure 5:
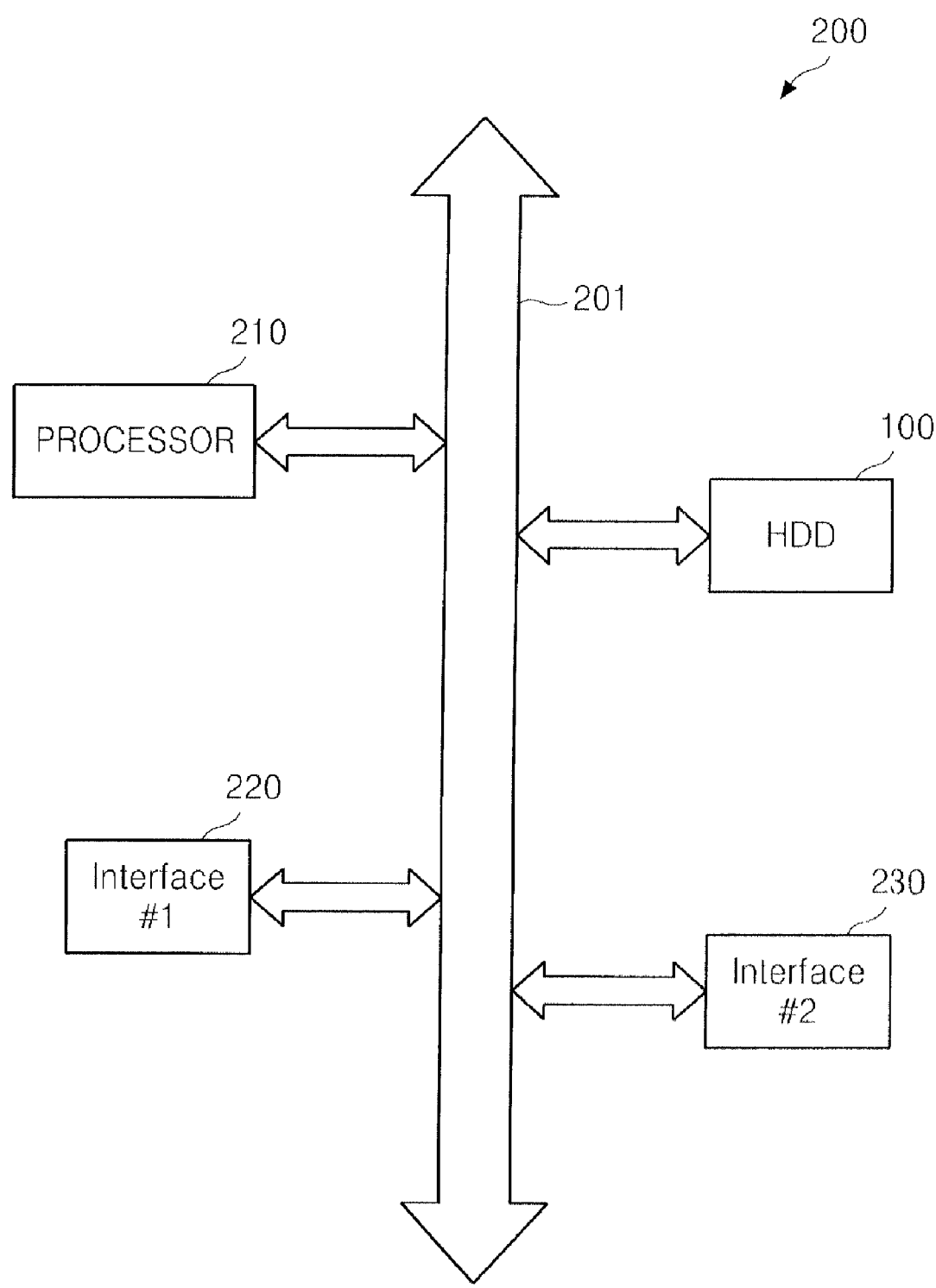
FIG. 5 is a block diagram of a computer system including the hard disk drive illustrated in FIG. 1.

FIG. 5 illustrates a block diagram of a computer system including the hard disk drive 100 illustrated in FIG. 1. Referring to FIG. 5, a computer system 200 includes all data storage devices which may use a magnetic storage medium as a storage device, including, but not limited to, a PC, a portable computer, a handheld communication device, a digital TV and a home automation device.

The computer system 200 includes the HDD 100 and a processor 210 connected to each other through a system bus 201. The processor 210 may perform a function as a host of the HDD 100 and control a general operation, e.g., a write operation and/or a read operation, of the HDD 100. The HDD 100 may calculate the number of ECC symbols of every sector, which becomes an object of defect scan, as discussed above with reference to FIGS. 1 to 4, may set a defect reference value based on a result of the calculation, and may adaptively set the defect reference value based on a log stored in a memory and a size of a replacement region of the storage medium 10.

The computer system 200 may further include a first interface 220. The first interface 220 may be an input/output interface. The input/output interface may be an output device such as a monitor, a printer, etc., or may be an input device, including, but not limited to, a touch screen, a mouse and a keyboard. The computer system 200 may further include a second interface 230. The second interface 230 may be a wireless communication interface to wirelessly communicate with an external computer system. Accordingly, the second interface 230 may wirelessly transmit data stored in the HDD 100 to an external computer system, and/or store data transmitted from the external computer system to the HDD 100 under a control of the CPU 210.

When the computer system 200 according to exemplary embodiments is embodied as a hybrid HDD, the computer system 200 may further include a non-volatile memory device. Accordingly, the CPU 210 may store data in the HDD 100 and/or the non-volatile memory device according to a data storage policy.

A hard disk and a method of managing a defect thereof according to an exemplary embodiment of the present general inventive concept may adaptively determine a defect reference value based on a size of a replacement region, so the replacement region may be used efficiently. Accordingly, a yield and reliability of the hard disk may be increased.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A method comprising:
    setting a defect reference value in response to (1) a number of error correction code (ECC) symbols calculated in a sector and (2) a size of a replacement region.

2. The method of claim 1, wherein the setting the defect reference value comprises:
    storing a log of the number of calculated ECC symbols of a sector in a memory or a magnetic storage medium.

3. The method of claim 1, further comprising;
    identifying a sector as a defect sector when the sector has a number of ECC symbols greater than a set defect reference value.

4. A controller that sets a defect reference value in response to (1) a calculated number of error code correction (ECC) symbols in a sector and (2) a size of a replacement region.

5. The controller of claim 4, wherein the controller sets the defect reference value adaptively to determine a corresponding sector as a defect sector.

6. The controller of claim 4, wherein the controller stores the number of calculated ECC symbols of a sector in a memory or a magnetic storage medium and sets the defect reference value adaptively to identify a corresponding sector as a defect sector.

7. A computer system comprising:
    a hard disk drive; and
    a processor to control an operation of the hard disk drive, wherein the hard disk drive comprises:
        a magnetic storage medium;
        a head; and
        a hard disk controller to calculate a number of ECC symbols of every sector to becomes an object of a defect scan based on a signal output from the head and to set a defect reference value based on a result of the calculation and a size of a replacement region.

8. The computer system of claim 7, wherein the hard disk controller sets a sector having the number of ECC symbols greater than a set defect reference value as a defect sector.

* * * * *